3,184,899
HELIUM SEPARATION

David Frazier, Hudson, Ohio, assignor to The Standard Oil Company, Cleveland, Ohio, a corporation of Ohio
No Drawing. Filed Dec. 31, 1958, Ser. No. 784,062
4 Claims. (Cl. 55—16)

This invention relates to a novel process of separating helium from a gas containing the same. It pertains particularly to a process of separating helium from a helium-containing natural gas by means of contacting said gas with a mass of small, hollow, hole-free, glass particles through which helium diffuses.

The demand for helium is in excess of supply. Furthermore, the future demand for this material is expected to expand rapidly due to the growth of known uses, coupled with the development of new applications. Helium is most abundantly found in natural gas deposits and hence the bulk of helium produced today is recovered from such sources. Presently there is but one commercial process for separating helium from natural gas—that of low temperature fractionation. Since helium is normally found in natural gas in very low concentrations, such a separation process requires that a tremendous quantity of gas must be cooled to temperatures so low that all the gas except helium is liquefied. This requires a plant of large capital investment involving complicated and expensive equipment.

In view of these circumstances, there exists considerable need for a process of generating helium from natural gas which might offer a more simple and economically attractive method than that presently employed, or to develop a method of economically enriching helium in natural gas which can then be subjected to separation in a conventional low temperature fractionation plant to provide a lower over-all process cost of separating helium than available presently.

It has been known for some time that gases may be separated from one another by allowing a gaseous mixture to fractionally permeate through a thin membrane which is selectively permeable to one of the gaseous components. It is also known that glass has a high permeability to helium relative to most other gases. Therefore, by bringing a stream of helium-containing natural gas into contact with one side of a glass wall and allowing a fraction to diffuse therethrough, a helium-enriched gas can be recovered on the other side of the glass wall. The present invention deals with a novel and more advantageous method of separating helium from a gaseous stream employing this principle of separation. Such advantages are obtainable due to the physical and geometric nature of the small, hole-free, glass particles that are used in the process comprising the present invention.

Briefly described, the process of the present invention involves exposing small, hollow, hole-free, glass particles to a helium-bearing gas until the partial pressure of helium inside the individual particles obtains a useful value. The partial pressure of helium outside the particles is then reduced by some desirable means so that the helium diffuses out of the particles for subsequent collection.

The hollow, hole-free glass particles used in the process of the present invention are formed from discrete particles of a feed mixture comprising ingredients forming a glass upon fusion thereof and incorporating a blowing agent. The preferred feed materials for preparing these particles and considerations affecting the selection and variations of the components thereof are disclosed in detail in co-pending application Serial No. 691,726, now Patent No. 2,978,340, issued April 14, 1961, assigned to my assignee. These particles of feed are converted into the desired hollow glass spheres used in the process of the invention in accordance with a preferred method and apparatus disclosed in co-pending application Serial No. 691,725, now Patent No. 2,978,339, issued April 14, 1961, assigned to my assignee, and the description of both of these applications is incorporated herein by reference to the extent as may be required for a clear and complete understanding of how these glass particles are produced. Briefly described, the feed particles are introduced into a heated zone at an elevated temperature and for a time sufficient to cause the particles to fuse and to liberate a gas coincident therewith from the blowing agent so that the particles become hollow spheres. The hollow glass spheres so formed then pass out of the heated zone and are cooled and subsequently collected.

In general, the glass particles will have a size range preferably within 10 to 750 microns. A typical product, for instance, has particles within the size range of 10 to 350 microns with an average diameter of 100 microns. The gas density of a mass of the glass particles depends principally upon the relation of the volume of the spheres to wall thickness. Generally, the density may be controlled within the range of 0.25 to 0.45 gm./cc. but gas densities may range from 0.1 to 0.75 gm./cc. In general, the wall thickness may be expressed as a percentage of the diameter of the spheres and preferably will be about 0.75 to 1.5% in particles having a size of 10 to 500 microns. As an example, a sphere having the diameter of 350 microns and a gas density of 0.3 gm./cc. has a wall thickness of 4 microns, a little more than 1% of the diameter.

The particles may be formed from any glass-forming components and the word "glass" as used herein is intended to cover any glass or glass-like composition, including silica.

These hollow glass particles, due to their particulate nature and spherical shape, offer a highly desirable means for adapting the known separation principle involving the selective diffusion of helium through a glass wall to a large scale commercial operation. Due to their particulate nature, these particles may be easily adapted to any size or shape of containing vessel and hence when applied to a separation process, these particles permit the use of equipment of a simple and non-restrictive nature. The particulate nature of these particles also allows the most efficient volume utilization of any shaped vessel in which it is desired to carry out the separation process. Furthermore, the particulate nature of these particles will allow the mechanical disintegration of a fair percentage of the individual particles with very little effect on the over-all process, in contradistinction to other means of supplying equal areas of glass to be used for the same purpose. Moreover, replacement of these particles becomes a very simple matter due to their physical nature. The spherical shape of these glass particles provides greater mechanical strength at equal wall thickness compared with other possible geometrical shapes of glass, and therefore thinner glass walls may be utilized to obtain higher diffusion rates of helium. Furthermore, the spherical shape and small diameter of these glass particles permits close packing of a large number of particles per unit of the working volume, offering a proportionately larger surface for the diffusion process than may be afforded by other geometrical shapes.

The process of the invention is believed to depend primarily on a partial pressure differential. The diffusion of the helium through the walls of the glass particles will continue until the partial pressure of helium outside is equal to that inside, after which time the system reaches equilibrium. The driving force, therefore, for the diffusion of helium into and out of the hollow interior of the glass particles is dependent upon the differential helium partial pressure across the walls of the particles.

After the glass particles have taken up helium from the gas stream from which it is to be separated, some consideration must be given to preventing the loss of the trapped helium during the removal of the residual gas from outside the glass particles. It will be apparent that as the residual gases are withdrawn from around the outside of the particles, some helium is also removed. The partial pressure of helium outside the particles, therefore, drops below the helium partial pressure inside the particles and helium diffuses out of the interior of the patricles back into the residual gases being removed. This loss of helium may be reduced to a nominal amount by either reducing the diffusion rate of the helium out of the glass walls by some means, such as by temperature reduction, or by decreasing the time interval for removing the residual gases.

The diffusion rate will be further affected by the glass composition of the walls. The selection of a particular glass composition is not within the scope of the present invention. Information may be found in the literature showing the effect that glass constitution has on the diffusion rate of helium. The present invention relates to the discovery that hollow glass particles of the type described may be used to separate helium, and hence the use of glass particles prepared from any glass or glass-like composition is contemplated for use in the process.

The diffusion rate through the glass walls is also a function of wall thickness and the temperature of contacting. Diffusion rate is inversely proportional to wall thickness. Since wall thickness is generally a function of particle size, small particles will tend to have thinner wall thicknesses and allow higher diffusion rates. It will also be obvious that with particles of uniform size, those of lower density would be expected to have thinner walls. Therefore, it will be apparent that small particles of low density are preferred for the process of the invention. The diffusion rate increases with an increase in operating temperatures and is proportional to some power of absolute temperature which varies with the nature of the glass. Any temperature below the fusing point of the glass particles may be employed in the process but as a practical matter temperatures above 1000° F. will not be desirable due to economical considerations. Temperatures of 200 to 500° F. are preferred.

Because the diffusion rate increases with the partial pressure differential, the rate and the amount of helium diffused can be increased by the use of higher pressures and any pressure less than that which will crush the glass particles can be used. This will vary with the composition of the glass, particle size, and wall thickness. Pressures up to 1000 p.s.i.a. are suitable, but pressures of 400 to 800 p.s.i.a. are preferred for the inward diffusion.

Various process schemes may be employed based upon the separation principles discussed heretofore. However, the best mode now contemplated for carrying out the separation of the invention resides in a fixed bed type of process scheme as set forth in the following general description.

Two cylindrical vessels are employed in the process, each of which is filled with hollow glass spherical particles to the extent that the volume inside the particles is approximately 50% of the volume of the vessel. The two vessels are connected to a conduit in which a stream of helium-containing natural gas is flowing in such a manner so that when one vessel is in communication with the natural gas-carrying conduit the other vessel is open to an evacuation system. The helium-containing natural gas is introduced under pressure to the first vessel at a selected temperature, and the contact period is a time sufficient to allow the partial pressure of helium to build up within the hollow interiors of the particles. The supply of helium-containing natural gas is then closed off to the first vessel and transferred to the second vessel for helium take-up. The first vessel is cooled and depressurized to atmospheric conditions and the gases outside the particles are evacuated. The first vessel is then heated to accelerate the release of helium from the interior of the glass particles, and the helium in the void volume of the vessel is continuously removed until the desired amount of helium has been released from the glass particles. The first vessel is now ready for another separation cycle after the particles in the second vessel are taken up with helium. When the take-up and release cycles are equivalent in time, the process becomes continuous by alternating the supply of helium-containing natural gas between the two vessels.

In the releasing cycle a stripping medium such as, for example, butane, carbon dioxide, etc., may be employed in substitution for the cooling, evacuation, and reheating of the vessel. The stripping medium is passed through the vessel continuously, removing helium from the void volume of the vessel so that the helium partial pressure inside the glass particles causes helium to diffuse out.

A more complete understanding of the separation process of the present invention will be gained from a discussion of the following more specific examples. The hollow glass particles used in these examples had a bulk density of 0.30 gm./cc. and a size range of from 10 to 350 microns with an average diameter of 100 microns. These particles were formed from a feed material consisting of a uniform mixture of sodium silicate, boric acid, and urea in the proportions of 40 parts sodium silicate $Na_2O \cdot (SiO_2)_{3.22}$, 5.6 parts $H_3BO_3$, and 1 part urea (on a dry basis) and was prepared in accordance with the preferred embodiment of co-pending application Serial No. 691,726. The feed material was converted into hollow particles in accordance with the preferred embodiment of the method described in co-pending application Serial No. 691,725. All analyses of gaseous samples were made by means of a mass spectrometer.

*Example 1*

20.68 grams of the hollow glass particles was weighed into a 150 cc. glass flask attached with a manometer. The system was evacuated at room temperature. 415 millimeters Hg (mm.) of methane and 244 mm. of helium were admitted to the flask. The flask was heated rapidly to 200° C. with an electrically heated air bath to a maximum pressure of 1030 mm. The change in pressure with time was recorded over 6½ hours. After that time the pressure dropped to 772 mm., most of the pressure drop occurring in the first two hours of the contacting. At the end of 6½ hours, the gaseous atmosphere surrounding the glass particles in the flask was sampled and analyzed. These analyses were on a mol percent basis and showed the gaseous atmosphere to contain 32.7% helium and 66.2% methane. The flask containing the glass particles was then cooled and evacuated to remove the remaining gas surrounding the particles. The flask was then reheated to 200° C. for 1½ hours to release helium from the hollow interior of the glass particles. The pressure rise during this releasing period was 101 mm. The gaseous atmosphere now surrounding the glass particles was sampled and analyzed, showing 100% helium and 0% methane.

*Example 2*

A steel bomb having a capacity of 300 cc. was filled with 50 gms. of the glass particles and was then charged with helium to 30 p.s.i.g. and then with methane to a total pressure of 1450 p.s.i.g. The steel bomb was heated for 6½ hours at 135° C. whereby the maximum pressure within the bomb was 2000 p.s.i.g. The bomb was then cooled and the gaseous atmosphere surrounding the glass particles was sampled and analyzed to be 99+% methane.

The bomb was then reduced to atmospheric pressure and temperature, evacuated, and closed off. The bomb was then reheated at 135 to 155° C. for 10 hours. After this period, the bomb was cooled and the gaseous atmosphere outside the glass particles was sampled and analyzed. It was found to contain 74% helium and 22% methane. The balance of the gas mixture was air which either found its way into the bomb or the sample container.

*Example 3*

The steel bomb of Example 2 was filled with a fresh sample of 50 gms. of glass particles and was charged with helium to a pressure of 30 p.s.i.g. and then with methane to a total of 1450 p.s.i.g. The bomb and its contents were heated for 16 hours at 130° C. developing a maximum pressure of 2000 p.s.i.g. The bomb was cooled and the gaseous atmosphere surrounding the glass particles was sampled and analyzed in a mass spectrometer. The contents were found to be 5% helium and 95% methane.

The bomb was reduced to atmospheric pressure and temperature, evacuated, and then closed off. The bomb was reheated at 135° C. for 46 hours. After this time the bomb was cooled and the gaseous atmosphere surrounding the glass particles was sampled and an analysis of the mixture showed 91.8% helium and 6.8% methane. The balance of the gas mixture was air which either found its way into the bomb or the sample container.

It is to be understood that various modifications of the separation method of the present invention will suggest themselves to those skilled in the art upon reading the foregoing description. It is intended that all such modifications are included as may be defined by the appended claims.

I claim:

1. A process of separating a gas enriched in helium from a gaseous mixture containing the same comprising contacting within a closed vessel said gaseous mixture with a mass of small, hollow, imperforate particles formed from a glass through which helium selectively diffuses relative to the other components of said gaseous mixture, maintaining a positive helium partial pressure differential across the glass walls of said particles with the high pressure on the exterior of said particles whereby helium diffuses into the hollow interior of said particles, reducing the partial pressure of helium outside of said particles to a level below the helium partial pressure inside the glass walls of said particles so that the helium diffuses out of the hollow interior of said particles, and collecting the helium diffused out of said particles.

2. A process of separating a gas enriched in helium from a gaseous mixture containing the same comprising contacting within a closed vessel said gaseous mixture with a mass of small, hollow, imperforate particles formed from a glass through which helium selectively diffuses relative to the other components of said gaseous mixture at an elevated temperature and a super-atmospheric pressure, maintaining a positive helium partial pressure differential across the glass walls of said particles with the high pressure on the exterior of said particles whereby helium diffuses into the hollow interior of said particles, reducing the pressure within said vessel to atmospheric conditions by removing at least part of the residual gases on the outside of said particles while maintaining said elevated temperature, maintaining the helium partial pressure on the inside of said particles higher than the helium partial pressure on the outside of said particles whereby the helium diffuses out of the hollow interior of said particles, and collecting the helium diffused out of said particles.

3. A process of separating a gas enriched in helium from a gaseous mixture containing the same comprising contacting within a closed vessel said gaseous mixture with a mass of small, hollow, imperforate particles formed from a glass through which helium selectively diffuses relative to the other components of said gaseous mixture at an elevated temperature and a superatmospheric pressure, said temperature being lower than the fusing point of said particles and said pressure being less than a pressure that will rupture the bulk of said particles, maintaining a positive partial pressure differential across the glass walls of said particles with the high pressure on the exterior of said particles whereby helium diffuses into the hollow interior of said particles, reducing the temperature and pressure within said closed vessel to atmospheric conditions, removing at least part of the residual gases remaining on the outside of said particles, heating the mass of said particles to an elevated temperature whereby helium diffuses out of the hollow interior of said particles, and collecting the helium diffused out of said particles.

4. A process of separating a gas enriched in helium from a gaseous mixture containing the same comprising contacting within a closed vessel said gaseous mixture with a mass of small, hollow, imperforate particles formed from a glass through which helium selectively diffuses relative to the other components of said gaseous mixture, maintaining a positive helium partial pressure differential across the glass walls of said particles with the high pressure on the exterior of said particles whereby helium diffuses into the hollow interior of said particles, removing at least part of the residual gases remaining on the outside of said particles, maintaining the helium partial pressure inside the glass walls of said particles higher than the helium partial pressure outside of said particles so that the helium diffues out of the hollow interior of said particles, and collecting the helium diffused out of said particles.

References Cited by the Examiner

UNITED STATES PATENTS 2,734,592    2/56    Jones.

REUBEN FRIEDMAN, *Primary Examiner.*

WESLEY COLE, WALTER BERLOWITZ, *Examiners.*